United States Patent
Chen et al.

[11] Patent Number: 6,006,186
[45] Date of Patent: Dec. 21, 1999

[54] METHOD AND APPARATUS FOR A PARAMETER SHARING SPEECH RECOGNITION SYSTEM

[75] Inventors: Ruxin Chen, San Jose; Miyuki Tanaka, Campbell; Duanpei Wu, Sunnyvale; Lex S. Olorenshaw, Corte Madera, all of Calif.

[73] Assignees: Sony Corporation, Tokyo, Japan; Sony Electronics, Inc., Park Ridge, N.J.

[21] Appl. No.: 08/953,026

[22] Filed: Oct. 16, 1997

[51] Int. Cl.⁶ ........................................... G10L 7/08
[52] U.S. Cl. ........................... 704/254; 704/256; 704/249
[58] Field of Search .................................. 704/256, 254, 704/255, 239, 240, 200, 249, 250

[56] References Cited

U.S. PATENT DOCUMENTS

| | | | |
|---|---|---|---|
| 4,592,085 | 5/1986 | Watari et al. .............................. 381/43 |
| 4,803,729 | 2/1989 | Baker ..................................... 704/231 |
| 5,003,601 | 3/1991 | Watari et al. .............................. 381/43 |
| 5,027,406 | 6/1991 | Roberts et al. .......................... 704/231 |
| 5,093,899 | 3/1992 | Hiraiwa .................................... 395/23 |
| 5,301,257 | 4/1994 | Tani ........................................ 395/11 |
| 5,335,261 | 8/1994 | Fujinaka ................................... 379/58 |
| 5,355,432 | 10/1994 | Tanaka et al. ........................... 704/234 |
| 5,390,278 | 2/1995 | Gupta et al. ............................ 395/2.52 |
| 5,390,280 | 2/1995 | Kato et al. .............................. 704/233 |
| 5,469,512 | 11/1995 | Fujita et al. ............................. 382/118 |
| 5,513,298 | 4/1996 | Stanford et al. ........................ 704/243 |
| 5,561,722 | 10/1996 | Watari et al. ............................ 382/209 |
| 5,566,271 | 10/1996 | Tomitsuka et al. ..................... 395/2.84 |
| 5,583,965 | 12/1996 | Douma et al. .......................... 395/2.84 |
| 5,615,296 | 3/1997 | Stanford et al. .......................... 395/2.1 |
| 5,621,859 | 4/1997 | Schwartz et al. ....................... 395/2.65 |
| 5,715,367 | 2/1998 | Gillick et al. ........................... 395/2.63 |
| 5,765,133 | 6/1998 | Antoniol et al. ........................ 704/355 |

*Primary Examiner*—Richemond Dorvil
*Attorney, Agent, or Firm*—Blakely, Sokoloff, Taylor & Zafman, LLP

[57] ABSTRACT

A method and an apparatus for a parameter sharing speech recognition system are provided. Speech signals are received into a processor of a speech recognition system. The speech signals are processed using a speech recognition system hosting a shared hidden Markov model (HMM) produced by generating a number of phoneme models, some of which are shared. The phoneme models are generated by retaining as a separate phoneme model any triphone model having a number of trained frames available that exceeds a prespecified threshold. A shared phoneme model is generated to represent each of the groups of triphone phoneme models for which the number of trained frames having a common biphone exceed the prespecified threshold. A shared phoneme model is generated to represent each of the groups of triphone phoneme models for which the number of trained frames having an equivalent effect on a phonemic context exceed the prespecified threshold. A shared phoneme model is generated to represent each of the groups of triphone phoneme models having the same center context. The generated phoneme models are trained, and shared phoneme model states are generated that are shared among the phoneme models. Shared probability distribution functions are generated that are shared among the phoneme model states. Shared probability sub-distribution functions are generated that are shared among the phoneme model probability distribution functions. The shared phoneme model hierarchy is reevaluated for further sharing in response to the shared probability sub-distribution functions. Signals representative of the received speech signals are generated.

45 Claims, 13 Drawing Sheets

METHOD AND APPARATUS FOR A PARAMETER SHARING SPEECH RECOGNITION SYSTEM

FIELD OF THE INVENTION

This invention relates to speech or voice recognition systems. More particularly, this invention relates to a speech recognition system based on a parameter sharing phoneme model.

BACKGROUND OF THE INVENTION

The broad goal of speech recognition technology is to create machines that can receive spoken information and act appropriately upon that information. In order to maximize benefit and universal applicability, speech recognition systems (SRSs) should be capable of recognizing continuous speech, and should be able to recognize multiple speakers with possibly diverse accents, speaking styles, and different vocabularies and grammatical tendencies. Effective SRSs should also be able to recognize poorly articulated speech, and should have the ability to recognize speech in noisy environments.

Acoustic models of sub-word sized speech units form the backbone of virtually all SRSs. Many systems use phonemes to define the dictionary, but some SRSs use allophones. The best recognition performance is typically obtained when acoustic models are generated for the sub-word units conditioned on their context; such models are called context-dependent sub-word models. When the chosen sub-word unit is the phoneme, the context-dependent modeling can capture allophonic variation and coarticulation. In the case of phones, context-dependent modeling only attempts to capture the effects of coarticulation.

Once a speaker has formed a thought to be communicated to the listener, they construct a phrase or sentence by choosing from a collection of finite mutually exclusive sounds, or phonemes. The basic theoretical unit for describing how speech conveys linguistic meaning is called a phoneme. As such, the phonemes of a language comprise a minimal theoretical set of units that are sufficient to convey all meaning in the language; this is to be compared with the actual sounds that are produced in speaking, which speech scientists call allophones. For American English, there are approximately 50 phonemes which are made up of vowels, semivowels, diphthongs, and consonants. Each phoneme can be considered to be a code that consists of a unique set of articulatory gestures. If speakers could exactly and consistently produce these phoneme sounds, speech would amount to a stream of discrete codes. However, because of many different factors including, for example, accents, gender, and coarticulatory effects, every phoneme has a variety of acoustic manifestations in the course of flowing speech. Thus, from an acoustical point of view, the phoneme actually represents a class of sounds that convey the same meaning.

The most abstract problem involved in speech recognition is enabling the speech recognition system with the appropriate language constraints. Whether phones, phonemes, syllables, or words are viewed as the basic unit of speech, language, or linguistic, constraints are generally concerned with how these fundamental units may be concatenated, in what order, in what context, and with what intended meaning. For example, if a speaker is asked to voice a phoneme in isolation, the phoneme will be clearly identifiable in the acoustic waveform. However, when spoken in context, phoneme boundaries become difficult to label because of the physical properties of the speech articulators. Since the vocal tract articulators consist of human tissue, their positioning from one phoneme to the next is executed by movement of muscles that control articulator movement. As such, there is a period of transition between phonemes that can modify the manner in which a phoneme is produced. Therefore, associated with each phoneme is a collection of allophones, or variations on phones, that represent acoustic variations of the basic phoneme unit. Allophones represent the permissible freedom allowed within a particular language in producing a phoneme, and this flexibility is dependent on the phoneme as well as on the phoneme position within an utterance.

Prior art SRSs can recognize phonemes uttered by a particular speaker. A speaker-dependent SRS uses the utterances of a single speaker to learn the models, or parameters, that characterize the SRS's internal model of the speech process. The SRS is then used specifically for recognizing the speech of its trainer. Accordingly, the speaker-dependent SRS will yield relatively high recognition results compared with a speaker-independent SRS. Prior art SRSs also perform speaker-independent recognition. The speaker-independent SRS is trained by multiple speakers and used to recognize many speakers who may be outside of the training population. Although more accurate, the disadvantage of a speaker-dependent SRS is the need to retrain the system each time it is to be used with a new speaker.

At present, the most popular approach in speech recognition is statistical learning, and the most successful statistical learning technique is the hidden Markov model (HMM). The HMMs are capable of robust and succinct modeling of speech, and efficient maximum-likelihood algorithms exist for HMM training and recognition. To date, HMMs have been successfully applied to the following constrained tasks: speaker-dependent recognition of isolated words, continuous speech, and phones; small-vocabulary speaker-independent recognition of isolated words; and speaker-independent phone recognition in large vocabulary continuous and isolated word recognition.

The HMMs provide a sound basis for modeling both the interspeaker and intraspeaker variability of natural speech. However, to accurately model the distributions of real speech spectra, it is necessary to have complex output distributions. For example, continuous density HMM systems require multiple Gaussian mixture components to achieve good performance. Furthermore, context-dependent triphones are required to deal with contextual effects such as coarticulation. Thus, a speaker-independent continuous speech HMM system will generally contain a large number of context-dependent models, each of which contains a large number of parameters. Unfortunately, the ability to arbitrarily increase model complexity is limited by the limited amount of training data and the statistical confidence of this data. Thus, the key problem to be faced when building a HMM-based continuous speech recognizer is maintaining the balance between model complexity, the corresponding processor requirements, and the available training data, and finding the best method by which to estimate the model parameters.

Traditional methods of dealing with this problem tend to be model-based. For example, for discrete and tied-mixture systems it is common to interpolate between triphones, biphones and monophones. One prior art technique of speaker-independent phone recognition generates a model based on multiple codebooks of linear predictive coding-derived parameters for a number of phones and then applies co-occurrence smoothing to determine the similarity between every pair of codewords from all phones, smoothing the individual distributions accordingly. However, a speaker-independent phone model is unstable because in actual speech the context depends on the preceding and the following phone; thus, each different context of a phone requires a different model which increases the speech recognition system memory requirements as well as decreasing system accuracy, efficiency, and speed.

In an attempt to avoid the need for smoothing, both stochastic decision trees and maximum a posteriori estimation approaches have been proposed. Another prior art speech recognition method produces a context-dependent Gaussian mixture HMM in which acoustic phone states are merged and then any cluster with insufficient training data is merged with its nearest neighbor. There also exists a prior art speech recognition system in which phones are clustered depending on their phonetic context into left and right contexts.

However, one of the limitations of the prior art model-based approaches is that the left and right contexts cannot be treated independently and since the distribution of training examples between left and right contexts will rarely be equal, this leads to a suboptimal use of the data.

In addition to the HMM, another approach available in speech recognition is the knowledge engineering approach. Knowledge engineering techniques integrate human knowledge about acoustics and phonetics into a phone recognizer, which produces a sequence or a lattice of phones from speech signals. While hidden Markov learning places learning entirely in the training algorithm, the knowledge engineering approach attempts to explicitly program human knowledge about acoustic/phonetic events into the speech recognition system. Whereas an HMM-based search is data driven, a knowledge engineering search is typically heuristically guided. Currently, knowledge engineering approaches have exhibited difficulty in integrating higher level knowledge sources with the phonetic decoder as a result of decoder complexity. Consequently, there is a requirement for a speech recognition system that combines knowledge engineering in an interchangeable way with stochastic methods including HMMs comprising phoneme models to produce and use a model for speech recognition that reduces memory requirements of the SRS while maximizing the use of available training data to reduce the error in parameter estimation and optimize the training result.

SUMMARY OF THE INVENTION

A method and an apparatus for a parameter sharing speech recognition system are provided. According to one aspect of the invention, speech signals are received into a processor of a speech recognition system. The speech signals are processed using a speech recognition system hosting a shared hidden Markov model (HMM) produced by generating a number of phoneme models. Some of the phoneme models are shared among the phonemes. The phoneme models are trained, and shared phoneme model states are generated that are shared among the phoneme models. Shared probability distribution functions (PDFs) are generated that are shared among the phoneme model states. Shared probability sub-distribution functions (PDSFs) are generated that are shared among the phoneme model PDFs. The shared phoneme model hierarchy is reevaluated for further sharing in response to the shared PSDFs. Sharing occurs among the levels of the speech recognition model as well as within the levels of the speech recognition model. Signals representative of the received speech signals are generated. This HMM model integrates discrete observation modeling and continuous observation modeling.

Generation of the shared phoneme models integrates knowledge engineering techniques into phoneme model generation. In one embodiment the phoneme models are generated by retaining as a separate phoneme model any triphone model having a number of trained frames available in a training library that exceeds a prespecified threshold or, alternatively, some phoneme model deemed to be important. A shared phoneme model is generated to represent each of the groups of triphone phoneme models for which the number of trained frames available in the training library having a common biphone exceed the prespecified threshold. A shared phoneme model is generated to represent each of the groups of triphone phoneme models for which the number of trained frames available in the training library having an equivalent effect on a phonemic context exceed the prespecified threshold. A shared phoneme model is generated to represent each of the groups of triphone phoneme models having the same center context.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for a parameter sharing speech recognition system are provided. The method and apparatus described herein may also be used in pattern recognition systems. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. It is noted that preliminary experiments with the method and apparatus provided herein show significant speech recognition improvements when compared to typical prior art context-independent, discrete speech recognition systems.

Figure 1:
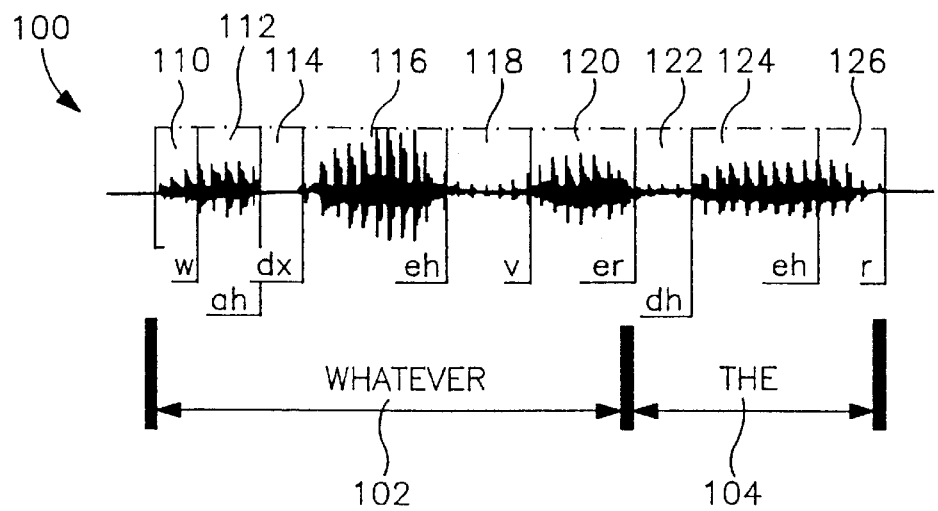
FIG. 1 shows a speech signal as a one-dimensional waveform.

FIG. 1 shows a speech signal 100 as a one-dimensional waveform. The speech signal 100 corresponding to words in a continuously spoken utterance can be segmented into words. The speech signal 100 is comprised of the words "whatever" 102 and "the" 104 in a continuously spoken sentence. The speech signal 100 can be labeled with a sequence of phonemes wherein each word 102 and 104 comprises one or more continuous phonemes 110–126. The word "whatever" 102 substantially comprises the phonemes "w" 110, "ah" 112, "dx" 114, "eh" 116, "v" 118, and "er" 120. The word "the" 104 substantially comprises the phonemes "dh" 122, "eh" 124, and "r" 126.

An HMM is a stochastic finite state automaton, or a type of abstract machine used to model a speech utterance. The utterance modeled by an HMM of one embodiment may be, but is not limited to, a word, a subword unit like a phoneme, or a complete sentence or paragraph. Using the HMM, a speech utterance is reduced to a string of features, or observations, because these features represent the information that is "observed" from the incoming speech utterance. Therefore, an HMM which is associated with a particular phoneme or other utterance is a finite state machine capable of generating observation strings. An HMM is more likely to produce observation strings that would be observed from real utterances of its associated phoneme.

The HMM is used in two phases of speech recognition. In the training phase, the HMM is trained as to the statistical makeup of the observation strings for its dedicated phoneme. In the recognition phase the HMM receives as input a given incoming observation string, and it is imagined that one of the existing HMMs produced the observation string. The phoneme associated with the HMM of highest likelihood is declared to be the recognized word.

Figure 2:
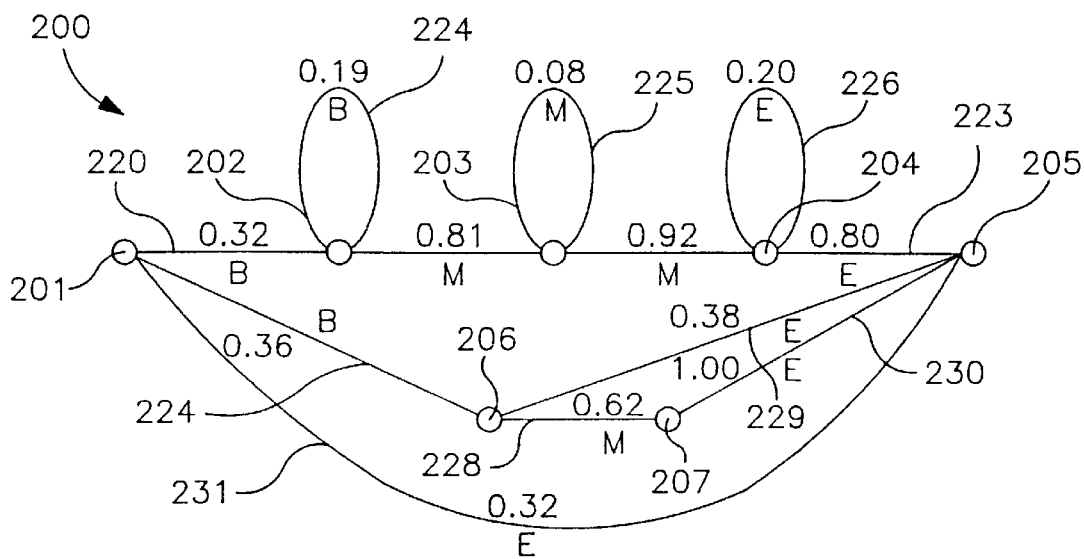
FIG. 2 shows one trained phonetic HMM topology for phone /d/.

FIG. 2 shows one trained phonetic HMM 100 topology for phone /d/. The structure, or topology, of the is determined by its allowable state transitions. This model represents the phone /d/ using seven states 201–207 and twelve transitions 220–231. The HMM generates observation sequences by jumping from state to state and emitting an observation with each jump. The HMM generally used for modeling acoustic signals emits an observation upon arrival at each successive state. At each observation time, corresponding to the times at which observations are extracted from the speech utterances to be recognized, a state transition is assumed to occur in the model. The likelihood of these transitions is governed by the state transition probabilities. These state transition probabilities appear as labels on the transitions 220–231, or arcs connecting the states 201–207. The sequence of states that occurs enroute to generating a given observation sequence defines the first of two random processes associated with an HMM, the matrix of state transition probabilities or the state transition matrix. The state transition matrix taken together with an initial state probability vector completely specifies the probability of residing in any state at any time.

Figure 3:
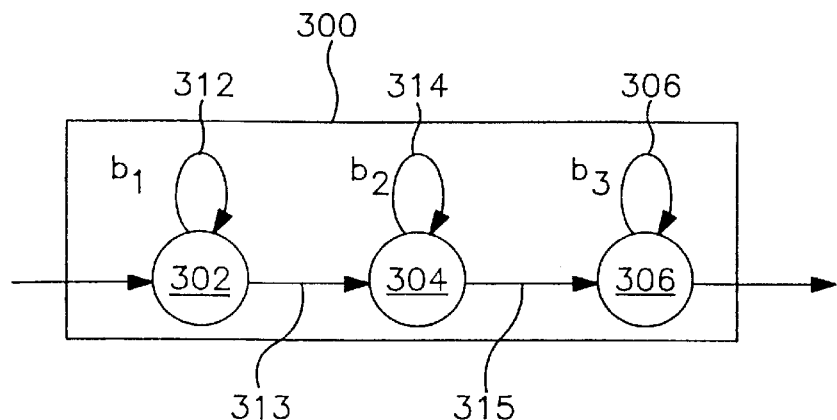
FIG. 3 shows a multiple-state left-to-right HMM phoneme model of one embodiment.

A left-to-right HMM process is used to model the speech waveform in the SRS of one embodiment. FIG. 3 shows a multiple-state left-to-right HMM phoneme model 300 of one embodiment. A series of HMMs corresponds to a series of phonemes. Therefore, HMM phoneme model 300 will be preceded and followed by other HMM phoneme models, the other HMM phoneme models being similar to HMM phoneme model 300 in one embodiment. The HMM phoneme model 300 is comprised of three states 302–306. States are used to represent identifiable acoustic phenomena. Therefore, the number of states is often chosen to correspond to the expected number of such phenomena in the utterance. When HMMs are used to model phonemes, three states are typically used: one state for the onset transition, one state for the steady-state portion of the phone, and one state for the exiting transition. The three-state HMM 300 is used to model a context-dependent phoneme in the context of its left and right phones. The observations are emitted from each state, and the observations emitted from each state form a distribution that can be formulated as a probability distribution $b_s$, where s refers to a state in the HMM. Each state transition 312–316 is associated with a state transition probability $a_{s,j}$ which denotes the probability of a transition using the arc j of state s. For example, suppose there are B types of observations, and $b_{si}$ denotes the distribution of state s and type i, then $$b_s = \sum_i b_{si}, i = 1 \ldots B$$

Observation vectors may contain, but are not limited to, many features that are used as observations. The most frequently used general features of speech used as observations include linear prediction (LP) parameters, cepstral parameters, and related quantities derived from the voltage levels of the speech signal, the power contained in the speech signal, and the energy present in a particular frequency band. These are frequently supplemented by short-term time differences that capture the dynamics of the signal, as well as energy measures such as the short-term energy and differenced energy. For example, in a typical application of the HMM, the incoming speech signal is sampled at a particular frequency, for example 8 kHz of higher, and analyzed on frames of a specified number of points having a specified overlap. These sample times become observation times. Multiple LP coefficients are then computed for each frame. These LP coefficients are converted to a multiple number of cepstral coefficients. In order to add dynamic information, a number of differenced cepstral coefficients are also included in the vector. Furthermore, a short-term energy measure and a differenced energy measure are included for each frame.

In a speech recognition system, an observation sequence generally may be modeled as either a discrete-time stochastic process or a continuous-time stochastic process. When the observation sequence is modeled as a discrete-time stochastic process, the generation of particular observations upon entering a state is governed by the observation probability sub-distribution for that state. The discrete observation HMM produces a finite set of discrete observations. The naturally occurring observation vectors are quantized into one of a permissible set using vector quantization methods. Prior to training any of the HMMs for the individual utterance, a set of continuous observation vectors from a large corpus of speech is used to derive a codebook. If there are Q possible vectors, or observations, in the codebook, then it is sufficient to assign an observation a single integer, q, where $$1 \leq q \leq Q$$

Subsequently, any observation vector used for either training or recognition is quantized using this codebook. For the discrete observation HMM in one embodiment, the distribution of state s and type i is a one dimensional array described by $$b_{si} = b_{si}[q] = \sum_k b_{sik}[q], q = 1 \ldots Q$$

where each scalar $b_{si}[q]$ denotes the probability of observing the vector quantized symbol q for state s; $b_{sik}[q]$ denotes the sub-distribution that is comprised of $b_{si}[q]$. The Q in the equation denotes the total number of q. The sub-distribution $b_{sik}$ for the discrete HMM allows for better compression of the discrete HMM parameters and for better sharing of the structure between the discrete HMM and the continuous HMM.

In the more general case in which the observation sequence is modeled as a continuous-time stochastic process, the observations are vector-valued and correspond to the unquantized vectors of the aforementioned features drawn from the speech. Therefore, the formal description of the HMM contains a multivariate PDF characterizing the distribution of observations within each state. For the continuous observation HMM in one embodiment, the distribution of state s and type i is $$b_{si} = b_{si}(o) = \sum_k b_{sik}(o),$$

where $$b_{sik}(o) = \frac{c_{sik}}{\sqrt{|v_{sik}|}} \times \exp\left(-0.5 \times \frac{(o - m_{sik})^2}{v_{sik}}\right)$$

A diagonal Gaussian mixture is used to represent the probability of the continuous observation vector o for state s. The variable $c_{sik}$ is the weight for mixture k of state s, type i. Similarly, the variable $m_{sik}$ is the mean for the Gaussian of mixture k. The variable $v_{sik}$ is the variance for mixture k.

As the discrete-time observation HMM is restricted to the production of a finite set of discrete observations, the quantized observation PDF for a state takes the form of impulses on a real line instead of a characteristic distribution. In contrast, the continuous-time observation HMM observation description contains a multivariate PDF characterizing the distribution of observations within each state. Consequently, prior art systems typically use either discrete-time or continuous-time observation models. One embodiment of the present invention integrates, or unifies, discrete observation modeling and continuous observation modeling by generating shared characteristic PDFs for discrete-time observations from continuous observation PDFs. This shared characteristic PDF is then divided into simple segments, or a simple probability sub-distribution function (PSDF), where the PSDFs are shared by both the continuous HMM and the discrete HMM.

As previously discussed, the naturally occurring observation vectors, or cepstrums, for each phoneme frame sample are quantized into a finite number so that the discrete observation HMM produces a finite set of quantized discrete observations for a phoneme. In one embodiment, the finite discrete observations for each cepstrum of each frame of each training data sample are plotted from the vector quantized discrete observations, and regions are established on the plot using statistical techniques known in the art. Centroids are established for each region, and quantized vectors of the incoming speech signals are assigned to the region which minimizes the distance between the quantized vector and the centroid. A PDF is then generated for each frame sample of a phoneme from the distribution of the quantized vectors in the corresponding regions using known statistical techniques.

Figure 4:
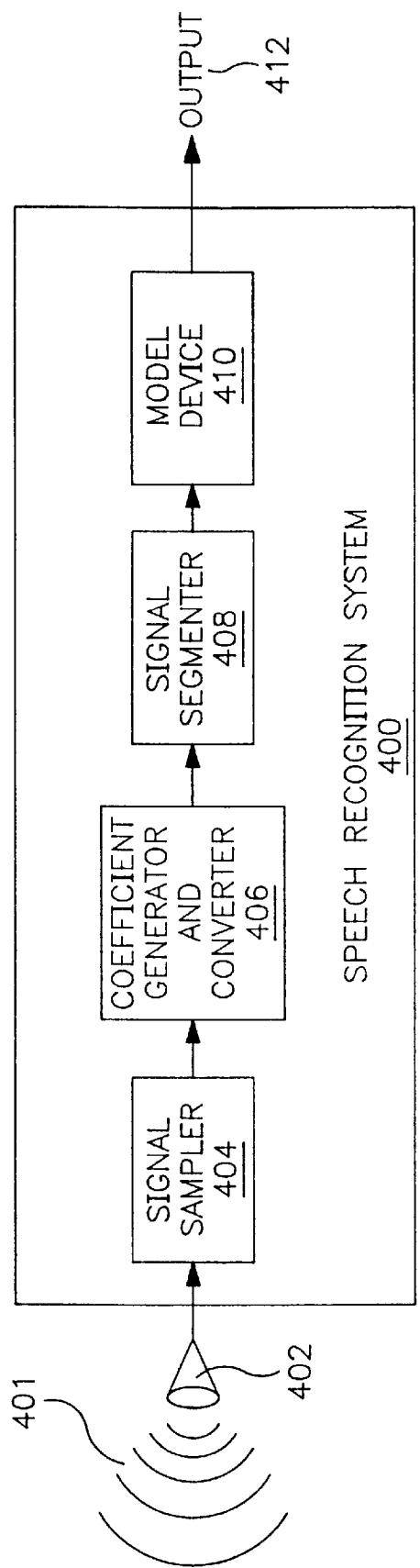
FIG. 4 shows a speech recognition system of one embodiment.

FIG. 4 shows a speech recognition system 400 of one embodiment. An input device 402 is coupled to the SRS 400 and inputs a voice signal 401 into the SRS 400 by converting the voice signal 401 into an electrical signal representative of the voice signal 401. A signal sampler 404 coupled to the input device 402 samples the signal at a particular frequency, the sampling frequency determined using techniques known in the art. A coefficient generator and converter 406 coupled to the signal sampler 404 computes cepstrum or LP coefficients or other speech features and converts these to cepstral coefficients. A signal segmenter 408 coupled to the coefficient generator and converter 406 segments the electrical signal representative of a voice signal into phonemes or phones or words, but is not so limited. A model device 410 coupled to receive the output of the signal segmenter 408 hosts a parameter sharing HMM that is used to model the speech utterance 401. The model device 410 provides output signals 412 representative of the received speech signals 401. The SRS comprising components 402–410 may be hosted on a processor, but is not so limited. For an alternate embodiment, the model device 410 may comprise some combination of hardware and software that is hosted on a different processor from SRS components 402–408. For another alternate embodiment, a number of model devices, each comprising a different model, may be hosted on a number of different processors. Another alternate embodiment has multiple processors hosting a single model. For still another embodiment, a number of different model devices may be hosted on a single processor.

Figure 5:
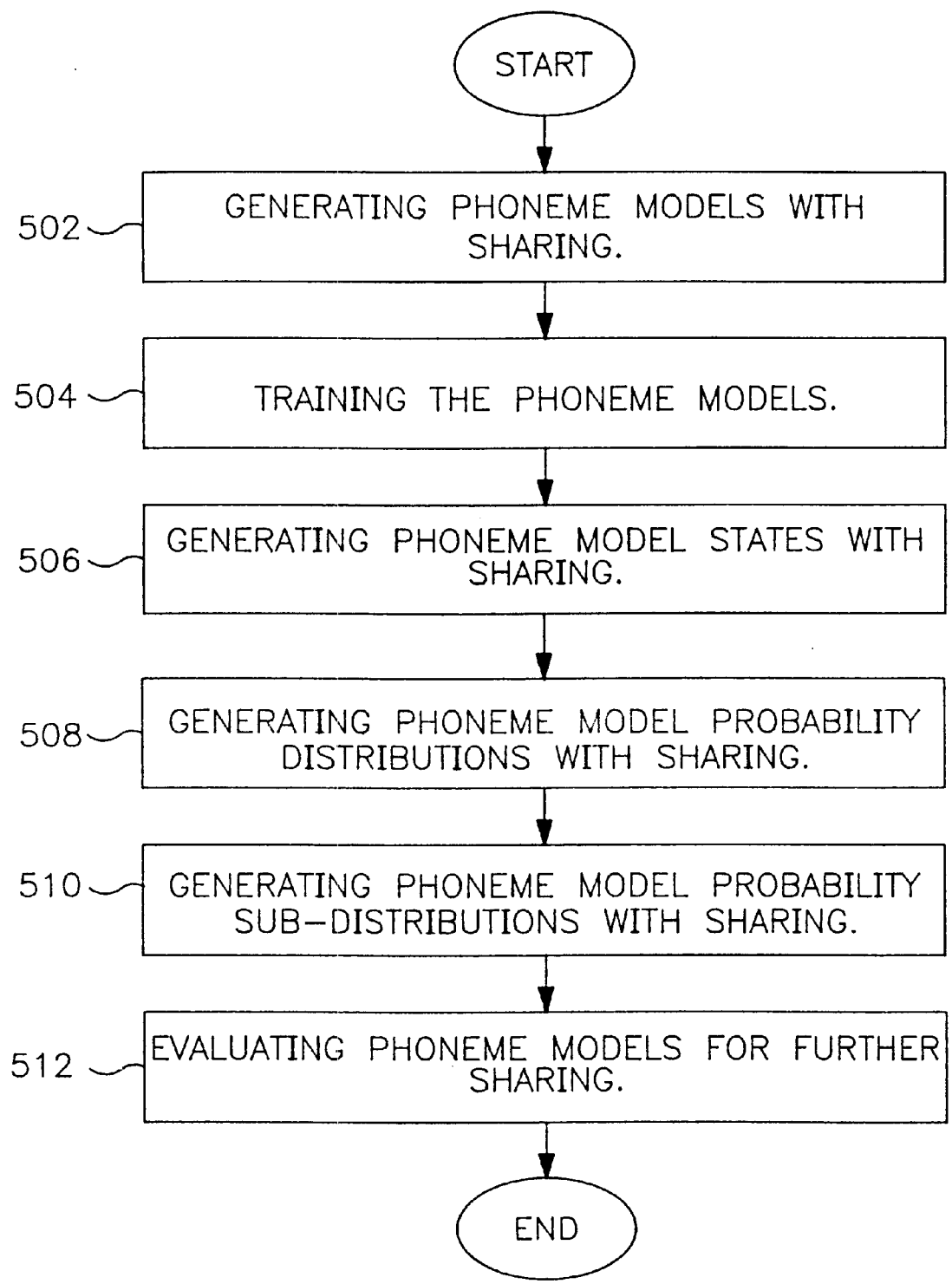
FIG. 5 is a flowchart for producing the parameter sharing HMM used in one embodiment.

FIG. 5 is a flowchart for producing the parameter sharing HMM used in one embodiment. The parameter sharing HMM used by the model device 410 of one embodiment of the present invention is based on a statistical learning approach that comprises multiple phoneme models. The parameter sharing HMM of one embodiment utilizes sharing among a number of model levels and sharing within each model level. Production of the HMM begins at step 502, at which multiple context-dependent phoneme models are generated in which some of the phoneme models are shared among multiple phonemes. The structure, or topology, of the generated HMM is based, at least in part, on the amount of training data available. Once generated, the HMM is trained, at step 504, using a particular library of training data as selected by the system designer. Training the HMM to represent a phoneme amounts to finding a procedure for estimating an appropriate state transition matrix and observation PDFs for each state.

Following the training of the HMM, a number of phoneme model states are generated, at step 506. These phoneme model states are representative of the phoneme models and may include shared states generated using a combination of statistical techniques known in the art and knowledge engineering in the area of acoustics processing. At step 508, a number of phoneme model probability distribution functions (PDFs) are generated. These PDFs are representative of the phoneme model states, and may include shared PDFs generated using a combination of statistical techniques known in the art and knowledge engineering in the area of acoustics processing. Following generation of the PDFs, a number of shared probability sub-distribution functions (PSDFs) are generated, at step 510. These PSDFs are representative of the phoneme model PDFs, and may include shared PSDFs generated using a combination of statistical techniques known in the art and knowledge engineering in the area of acoustics processing. At step 512, the shared phoneme models are evaluated for further sharing in light of the shared phoneme model states, PDFs, and PSDFs. This reevaluation of the sharing hierarchy for fewer sharing may be accomplished using a top-down approach or a bottom-up approach or a combination top-down and bottom-up approach as will be discussed herein.

Figure 6:
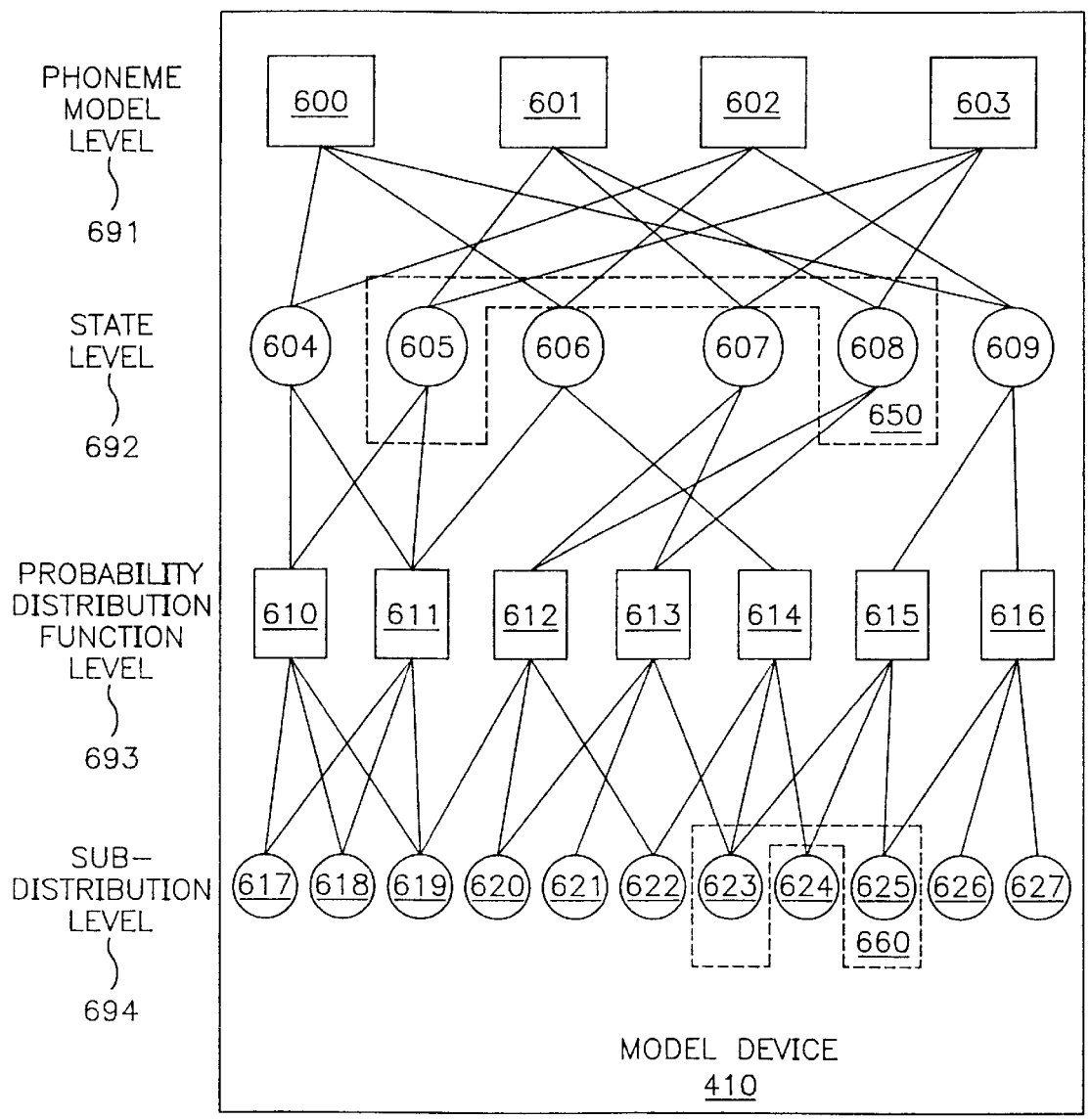
FIG. 6 shows the structure, or topology, of a parameter sharing HMM in one embodiment.

FIG. 6 shows the structure, or topology, of a parameter sharing HMM in one embodiment. This parameter sharing HMM is hosted by the model device 410 of the SRS, in one embodiment. The structure of the parameter sharing HMM is comprised of four levels 691–694 and, in this example, parameter sharing is used among all levels 691–694. The first level 691 comprises the phoneme models 600–603 of the HMM. The second level 692 comprises the phoneme model states 604–609 used to represent the phoneme models 600–603. In this embodiment, each phoneme model comprises three phoneme model states, but is not so limited. The third level 693 comprises the phoneme model PDFs 610–616 used to represent the phoneme model states 604–609. In this embodiment, each phoneme model state comprises two PDFs, but is not so limited. The fourth level 694 comprises the PSDFs 617–627 used to represent the phoneme model PDFs. In his embodiment, each phoneme model PDF comprises three PSDFs, but is not so limited.

An example of parameter sharing shown in FIG. 6 is the sharing of phoneme model state 606 by phoneme models 600 and 602. Another example of parameter sharing is the sharing of phoneme model PDF 610 by phoneme model states 604 and 605. Still another example of parameter sharing is the sharing of phoneme model PSDF 619 by phoneme model PDFs 610, 611, and 612.

Moreover, parameters can be shared within levels. For example, two states 605 and 608 of level 692 included in a model 603 may be statistically similar resulting in the generation of one phoneme model state 650 to represent these two states. As another example, phoneme model PSDFs 623 and 625 of level 693 may be statistically similar resulting in the generation of one phoneme model PSDF 660 to represent these two PSDFs.

Figure 6A:
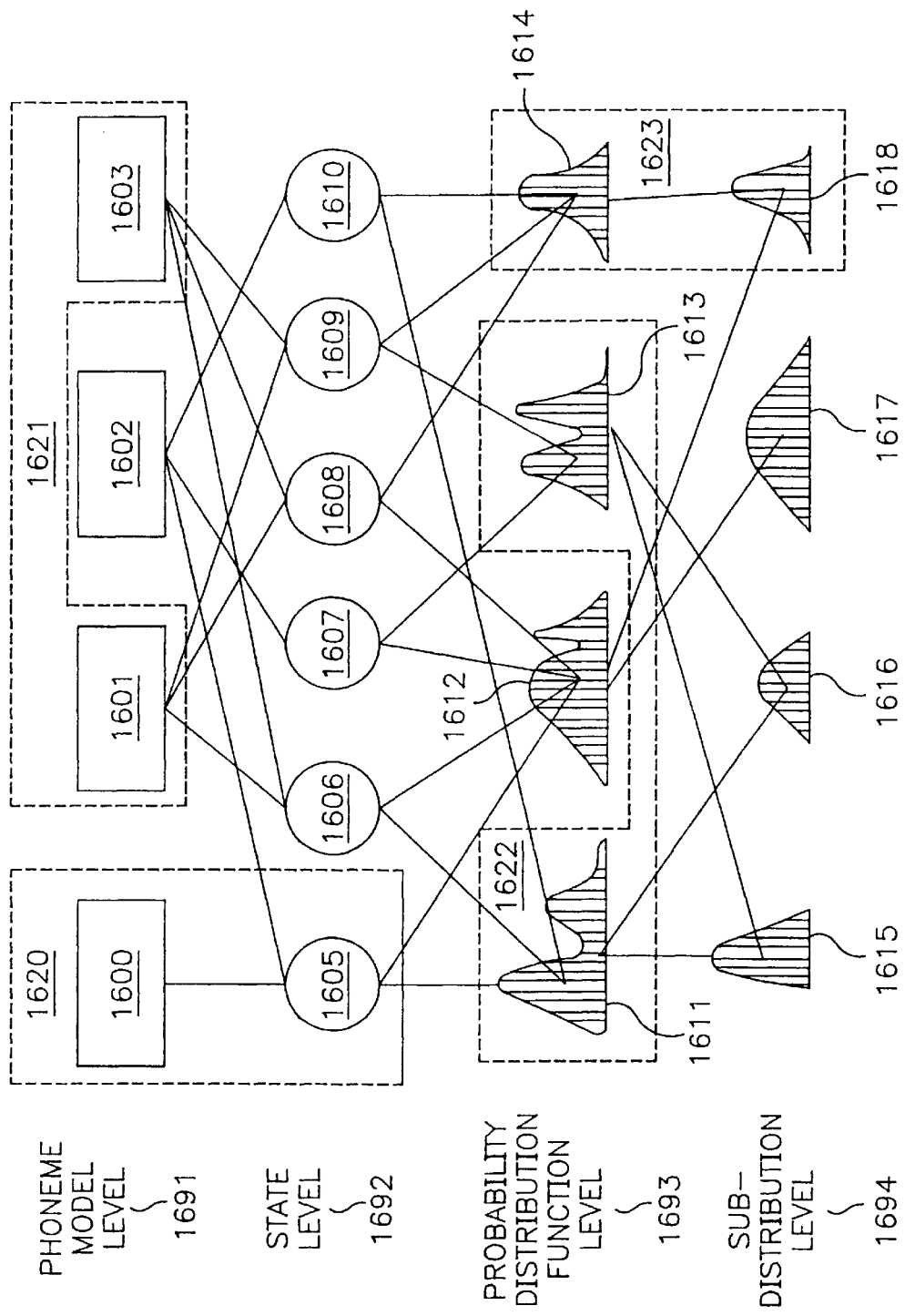
FIG. 6a is another depiction of the structure of a parameter sharing HMM in one embodiment.

FIG. 6a is another depiction of the structure of a parameter sharing HMM in one embodiment. Phoneme models 1601 and 1603 are shared within level 1691 to generate shared phoneme model 1621. Shared phoneme model 1621 shares phoneme model states 1606, 1608, and 1609 at level 1692. Phoneme model state 1620 is statistically representative of the three states comprised in phoneme model 1600 so that phoneme model 1600 at level 1691 shares with phoneme model state 1620 at level 1692. Phoneme model PDFs 1611 and 1613 are shared within level 1693 to generate shared phoneme model PDF 1622. Shared phoneme model PDF 1622 at level 1693 is shared by phoneme model states 1605, 1606, 1607, 1609, and 1610 at level 1692. Shared phoneme model PDF 1622 at level 1693 shares phoneme model PSDFs 1615 and 1616. Phoneme model PSDF 1618 is statistically representative of phoneme model PDF 1614 so that phoneme model PDF 1614 at level 1693 shares with phoneme model PDSF 1618 at level 1694.

Figure 7:
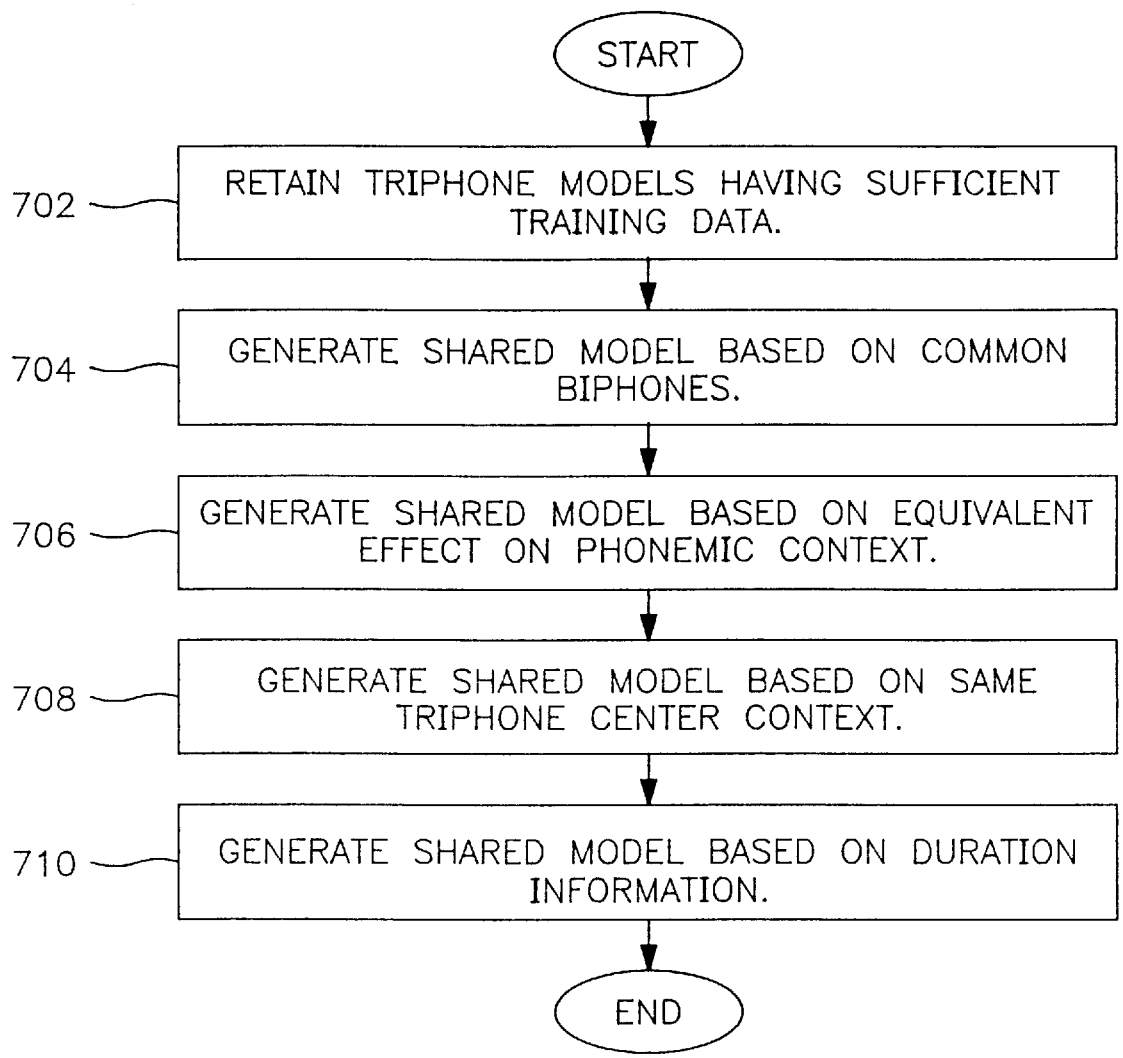
FIG. 7 is a flowchart for the method of generating the shared phoneme models in one embodiment.

FIG. 7 is a flowchart for the method of generating the shared phoneme models in one embodiment. The method of generating the shared phoneme models uses knowledge engineering techniques that integrate human knowledge about acoustics and phonetics into phoneme model generation to generate a hierarchy of sharing. The generation of the shared phoneme model does not require the actual training library data; instead the number of data, or frame, samples in the training library for each phoneme model is used. Using this data, at step 702, any triphone model having a number of trained frames available in the training library that exceeds a prespecified threshold is retained as a separate phoneme model. The threshold may be a predetermined level of statistical significance, but is not so limited. Furthermore, any phoneme model deemed to be important to a system designer may be retained.

After removing the models retained at step 702 from consideration, and after removing the frames used in step 702 to generate the retained models, a shared phoneme model is generated, at step 704, to represent each of the groups of triphone phoneme models for which the number of trained frames available in the training library having a common biphone exceed the prespecified threshold. The common biphone may comprise either the center context in combination with the right context of the triphone model, or the center context in combination with the left context of the triphone model. In the aforementioned sharing, the amount of training data, or number of frames, available for each model was used to determine the sharing structure.

Figure 8:
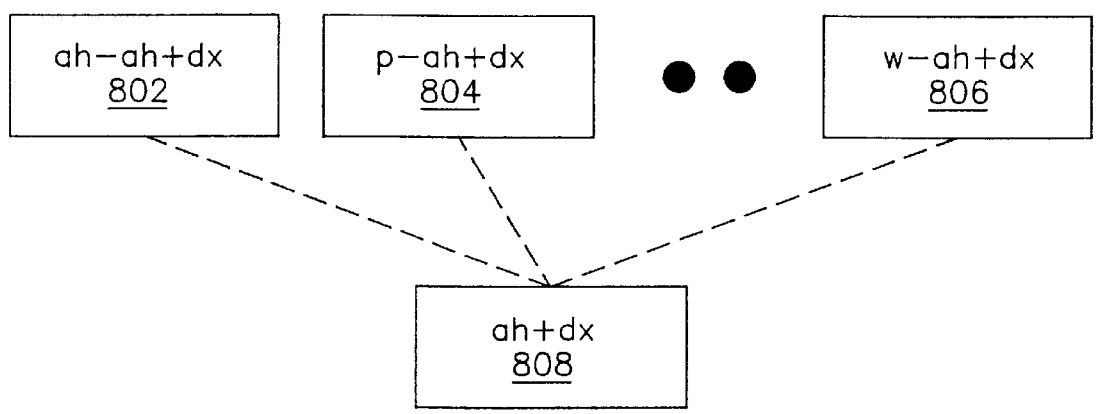
FIG. 8 shows phoneme model sharing between two triphone models having a common biphone in one embodiment.

FIG. 8 shows phoneme model sharing between two triphone models having a common biphone in one embodiment. For the context dependent HMM, the model comprising "w–ah+dx" means the phoneme "ah" having the left context phoneme "w" and the right context phoneme "dx". In this sharing example, triphones 802, 804, and 806 share the same center context "ah" and right context "dx". Taken together, the center context and the right context comprise a biphone 808. Therefore, one triphone phoneme model is generated having the statistical properties of the center context "ah" and the right context "dx". This phoneme model is used anywhere in the HMM that the phoneme model for any of the components 802–806 is required. Using knowledge engineering, it may be possible to generate a triphone phoneme model comprising the common biphone and having a left context with statistical properties that approximate the statistical properties of many of the component 802–806 left contexts.

After removing the models retained and generated at steps 702 and 704 from consideration, and after removing the frames used in steps 702 and 704 to generate the retained models, a shared phoneme model is generated, at step 706, to represent each of the groups of triphone phoneme models for which the number of trained frames available in the training library having an equivalent effect on a phonemic context exceed the prespecified threshold. This step is where a large amount of knowledge engineering is used in evaluating the "equivalent effect". The equivalent effect on a phonemic context for a center context may be an equivalent sound, but is not so limited. The equivalent effect on a phonemic context for a left and a right context may be an equivalent impact on the center context by the left and the right context, but is not so limited.

After removing the models retained and generated at steps 702–706 from consideration, and after removing the frames used in steps 702–706 to generate the retained models, a shared phoneme model is generated, at step 708, to represent each of the groups of triphone phoneme models having the same center context.

After removing the models retained and generated at steps 702–708 from consideration, and after removing the frames used in steps 702–708 to generate the retained models, a shared phoneme model is generated, at step 710, based on context duration data. Moreover, a shared triphone model may be generated to represent a group of phonemes wherein each context of the shared triphone model comprises statistical properties of a group of context phonemes.

As previously discussed, after the shared phoneme models are generated, the models are trained using the training library data. Following this training of the shared phoneme models, a multiple number of shared PSDFs are generated from the trained phoneme models. The actual training library data, or frames, is used to generate these PSDFs.

The generation of the shared PSDFs begins by generating a number of shared states from the states comprising each of the shared phoneme HMMs. The states represent segments of a phoneme of a speech signal. As previously discussed, three states are used in one embodiment: one state for the onset transition portion of the phoneme speech signal, one state for the steady-state portion of the phoneme speech signal, and one state for the exiting transition portion of the phoneme speech signal. The shared states have the same state transition probability and the same observation distribution. The shared states are generated by using a combination of statistical techniques known in the art and knowledge engineering in the area of acoustics processing to combine states.

Figure 9:
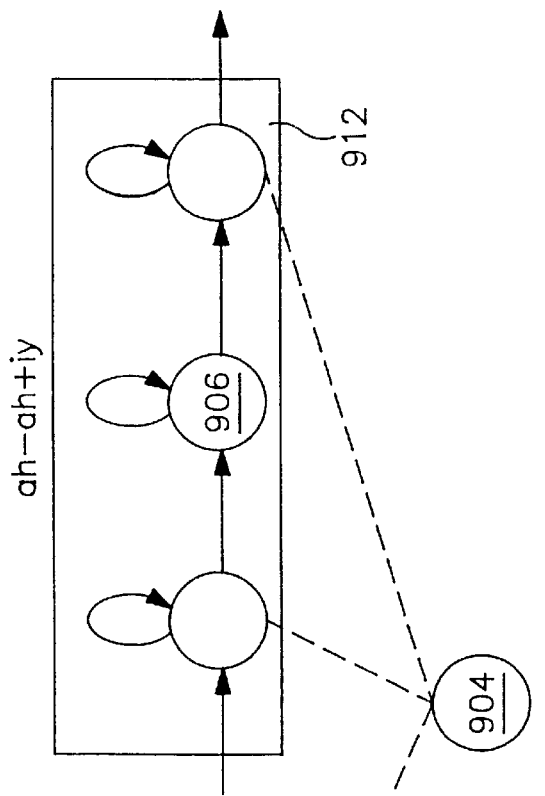
FIG. 9 shows state sharing between two triphone phoneme models in one embodiment.
Figure 9:
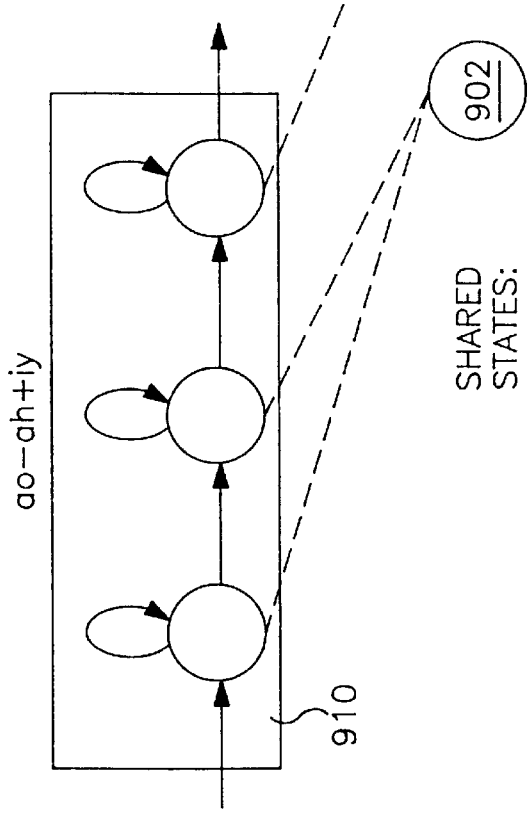

FIG. 9 shows state sharing between two triphone phoneme models in one embodiment. In this sharing example, triphones 910 and 912 share states 902 and 904. Triphone 910 is comprised of phoneme "ah" with left context "ao", and right context "iy"; triphone 910 is represented by states 902, 902, and 904, respectively. Triphone 912 is comprised of phoneme "ah" with left context "ah" and right context "iy"; triphone 912 is represented by states 904, 906, and 904, respectively.

The generation of the shared PSDFs continues by generating a number of shared phoneme model PDFs from the PDFs comprising each of the shared phoneme model states. In one embodiment, each state can have up to four PDFs, but is not so limited. The PDFs are generated, as previously discussed, from LP parameters, cepstral parameters, and related quantities derived from the voltage levels, power, and energy contained in a speech signal. For example, four often-used PDFs are generated from signal power plots, cepstral coefficients, differenced cepstral coefficients, and differenced differenced cepstral coefficients. The shared PDFs are generated by using a combination of statistical techniques known in the art and knowledge engineering in the area of acoustics processing to combine PDFs.

Figure 10:
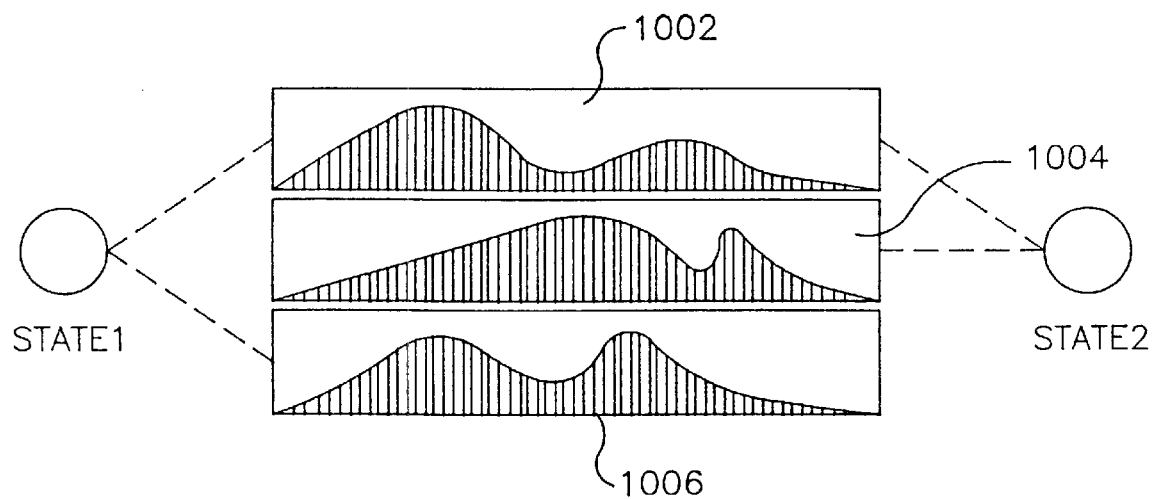
FIG. 10 shows probability distribution sharing between two phoneme model states in one embodiment.

FIG. 10 shows PDF sharing between two phoneme model states 1 and 2 in one embodiment. Each of the rectangles 1002–1006 represents one distribution $b_{si}$. In this sharing example, states 1 and 2 share PDFs 1002, 1004, and 1006. State 1 comprises PDFs 1002 and 1006. State 2 comprises PDFs 1002 and 1004.

The generation of the shared PSDFs continues by generating a number of shared phoneme model PSDFs from the sub-distributions comprising each of the shared phoneme model PDFs. For continuous-time observation HMMs, the mixture of Gaussian distributions $b_{si}(O)$ comprise the shared Gaussian PDFs. For discrete-time observation HMMs, the PDFs $b_{si}[q]$ comprise the shared discrete sub-distributions.

Figure 11:
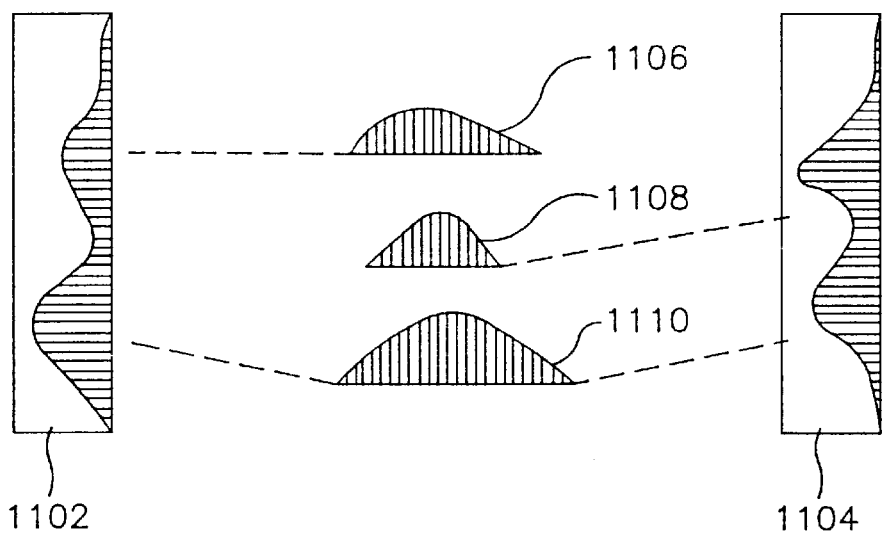
FIG. 11 shows Gaussian PDF sharing between two probability distributions in a continuous-time observation HMM of one embodiment.

FIG. 11 shows Gaussian PSDF sharing between two PDFs 1102 and 1104 in a continuous-time observation HMM of one embodiment. Probability distribution 1102 shares Gaussian PSDFs 1106 and 1110. Probability distribution 1104 shares Gaussian PSDFs 1108 and 1110.

Following the generation of a sharing hierarchy for the HMM, and in response to the multiple number of shared PSDFs generated from the trained phoneme models, the sharing hierarchy comprising the shared phoneme models, states, PDFs, and PSDFs is evaluated for further sharing. This reevaluation of the sharing hierarchy for further sharing may be accomplished using a top-down approach or a bottom-up approach.

Figure 12:
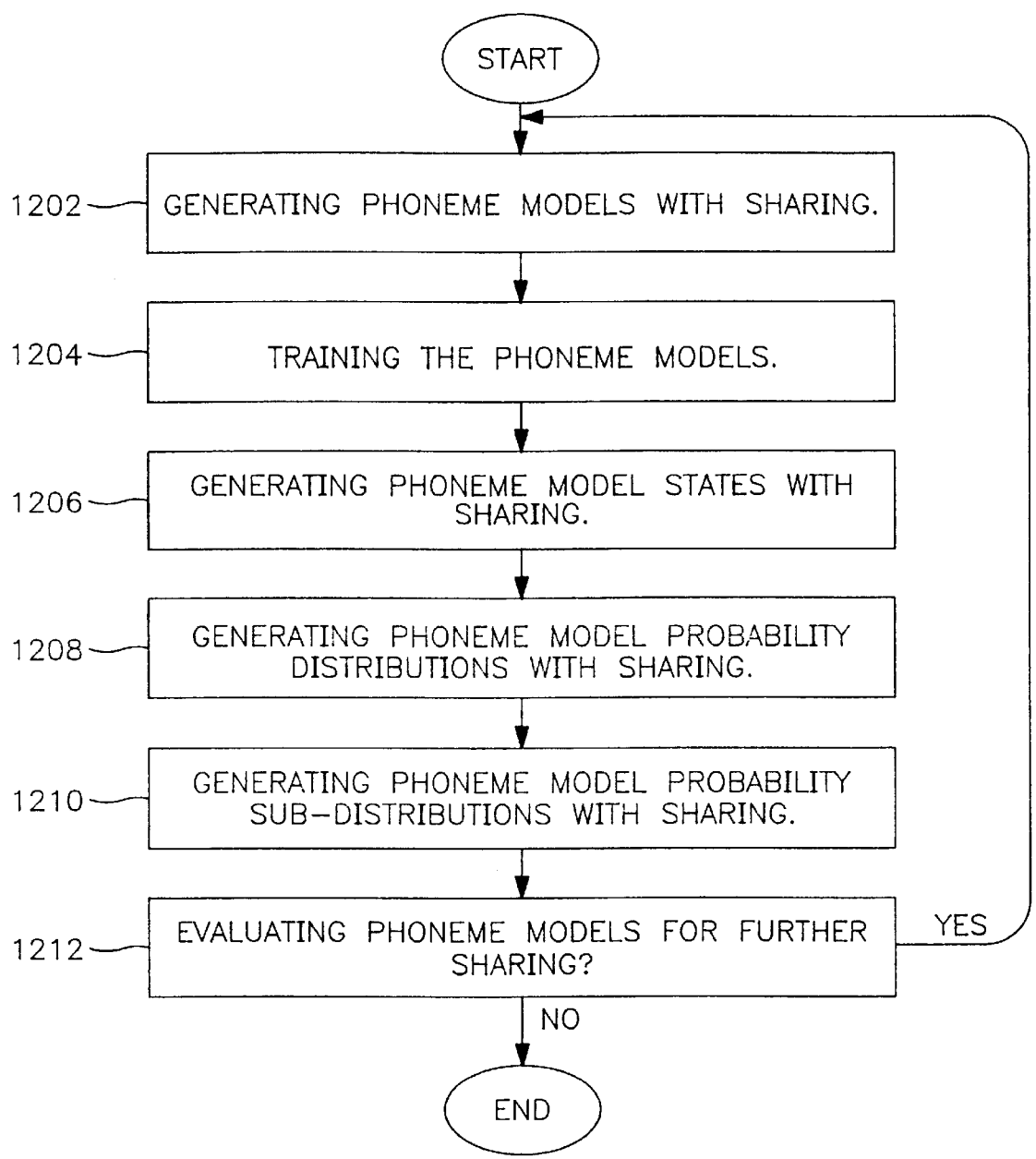
FIG. 12 is a flowchart for producing the parameter sharing HMM of one embodiment using top-down reevaluation.

FIG. 12 is a flowchart for producing the parameter sharing HMM of one embodiment using top-down reevaluation. The steps 1202–1210 of this top-down approach are the same as steps 502–510 of FIG. 5 so that this top-down approach repeats the steps used when initially generating the shared parameter HMM with the steps having the same ordering. However, if reevaluation of the generated phoneme models is required at step 1212, then operation continues at step 1202 where steps 1202–1210 are now reevaluated in light of the additional information provided by the previous hierarchical sharing. This approach may be repeated as many times as the system designer determines necessary.

Figure 13:
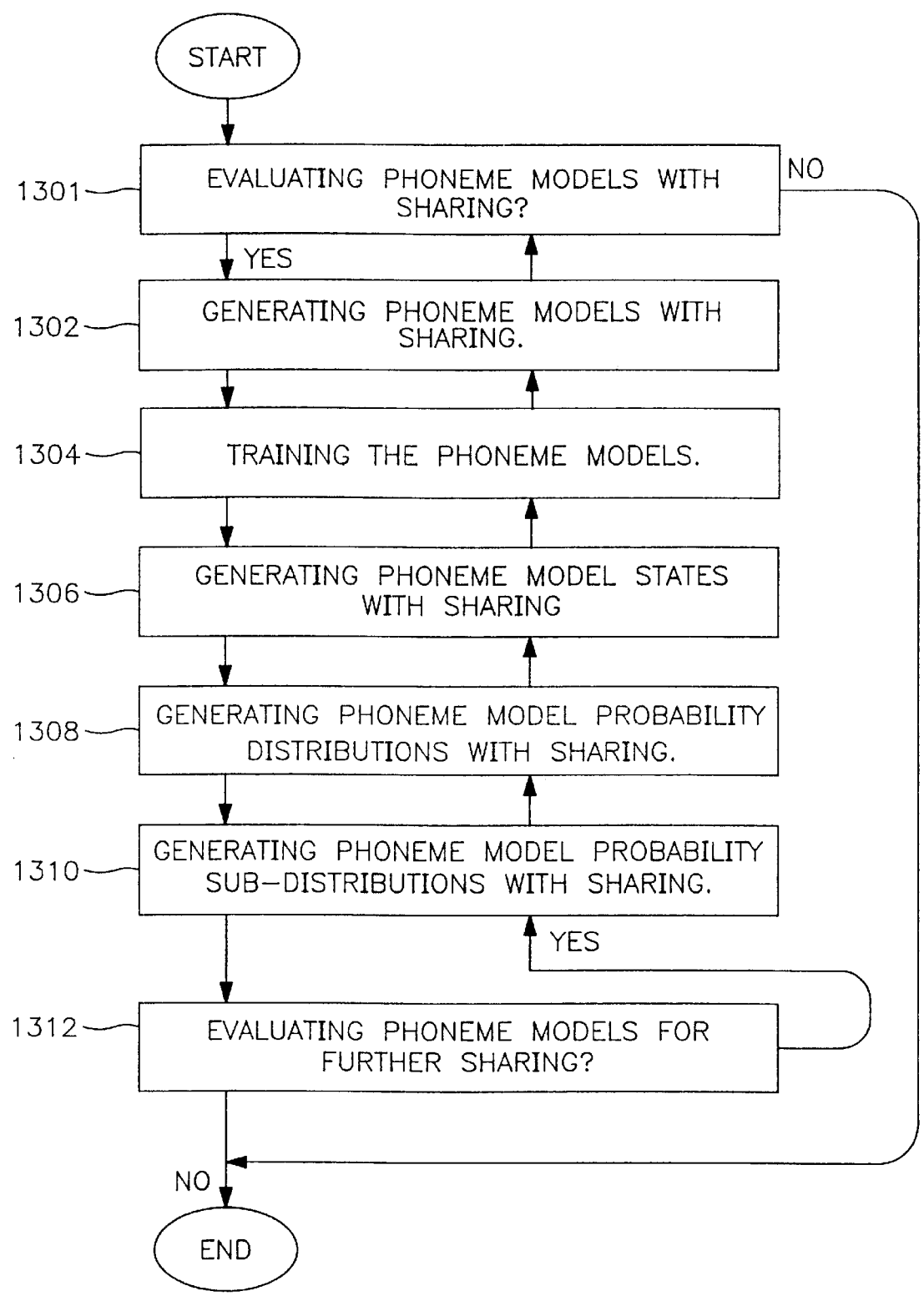
FIG. 13 is a flowchart for producing the parameter sharing HMM of one embodiment using bottom-up reevaluation.

FIG. 13 is a flowchart for producing the parameter sharing HMM of one embodiment using bottom-up reevaluation. When using the bottom-up reevaluation approach, operation begins at step 1301 at which a determination is made that the phoneme models are to be evaluated for further sharing as no sharing has been implemented because no model has been generated. Steps 1302–1310 are the same as steps 502–510 of FIG. 5 for initially generating the shared parameter HMM. However, if reevaluation of the generated phoneme models is required at step 1312, then operation continues by proceeding backwards sequentially from step 1310 through step 1301 whereby the bottom-up approach repeats the steps used when initially generating the shared parameter HMM, the steps of FIG. 5, except the steps are performed in the reverse order. This approach may be repeated as many times as the system designer determines necessary so that at step 1301, if further reevalution is determined to be necessary, then steps 1302 through 1312 are repeated. Using the bottom-up approach, a shared phoneme model PDF is generated to replace any PDFs that share all PSDFs. When all PSDFs are not shared, shared PDFs may still be generated by using a combination of statistical techniques known in the art and knowledge engineering in the area of acoustics processing to combine PDFs that are similar.

Following reevaluation of PDF sharing, a shared phoneme model state is generated to replace any states that share all PDFs. When all PDFs are not shared, shared states may still be generated by using a combination of statistical techniques known in the art and knowledge engineering in the area of acoustics processing to combine states that are similar.

Following reevaluation of state sharing, a shared phoneme model is generated to replace any models that share all states. When all states are not shared, shared models may still be generated by using a combination of statistical techniques known in the art and knowledge engineering in the area of acoustics processing to combine models that are similar. Either the top-down or bottom-up approach, or some combination thereof, may be repeated as many times as determined to be necessary by the system designer.

Figure 14:
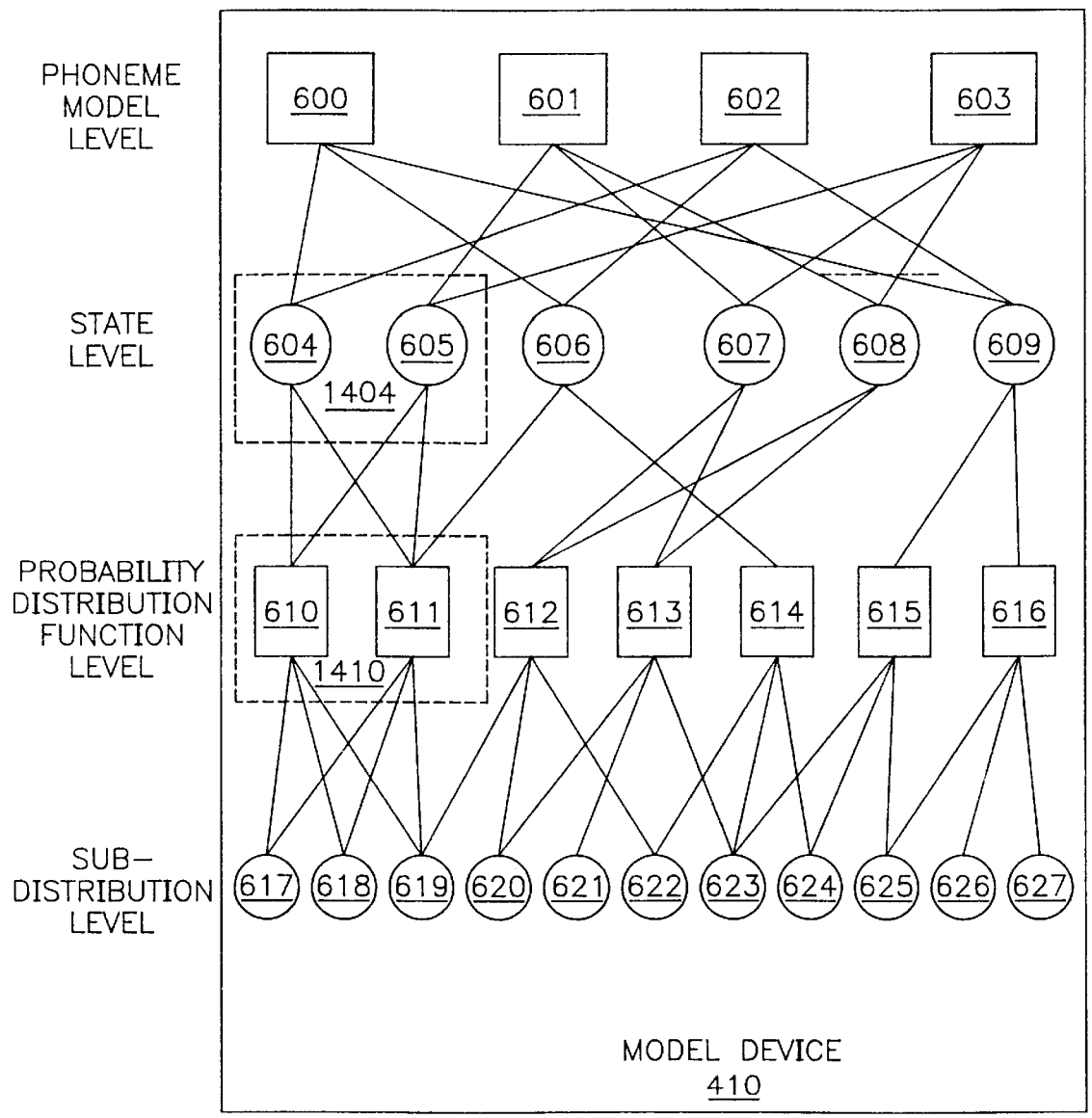
FIG. 14 shows an HMM structure following further sharing using a bottom-up approach in one embodiment.

With reference to FIG. 6, some examples of the reevaluation of the sharing hierarchy comprising the shared phoneme models, states, PDFs, and PSDFs for further sharing are provided. The parameter sharing referred to herein uses a combination of statistical techniques known in the art and knowledge engineering in the area of acoustics processing to provide combined models, states, PDFs, and PSDFs. FIG. 14 shows an HMM structure following further sharing using a bottom-up approach in one embodiment. Beginning at the bottom, or PSDF, level it is noted that PSDFs 617, 618, and 619 are shared by PDFs 610 and 611. Therefore, using parameter sharing, a single PDF 1410 may be generated to be used in the place of PDFs 610 and 611. At the PDF level, PDFs 610 and 611 are shared by phoneme model states 604 and 605. Therefore, using parameter sharing, a single state 1404 may be generated to be used in the place of states 604 and 605.

Figure 15:
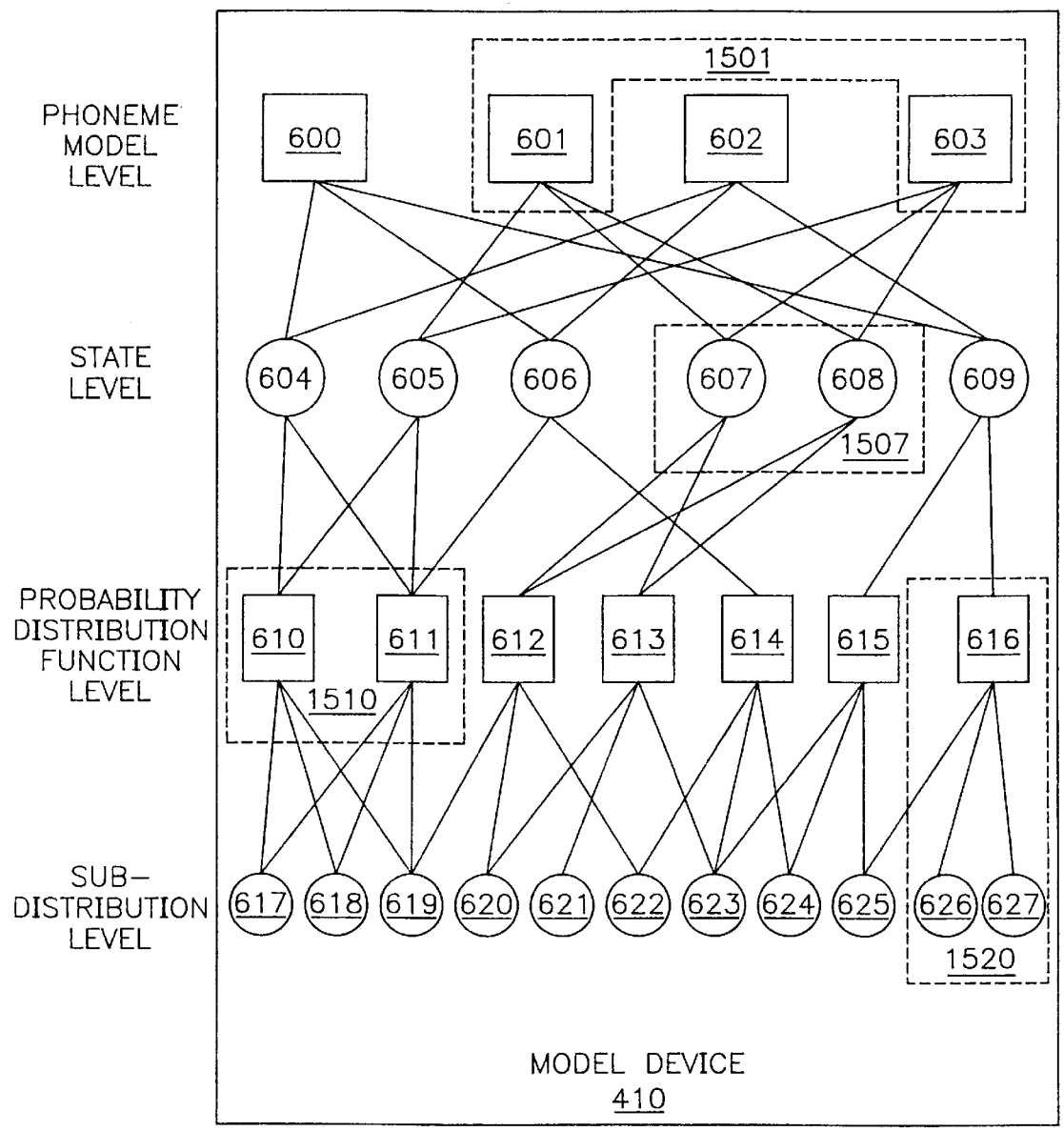
FIG. 15 shows an HMM structure following further sharing using a top-down approach in one embodiment.

FIG. 15 shows an HMM structure following further sharing using a top-down approach in one embodiment. Beginning at the phoneme model level, it is noted that models 601 and 603 share phoneme model states 605, 607, and 609. Therefore, using parameter sharing, a single phoneme model 1501 may be generated to be used in the place of models 601 and 603. At the phoneme model state level, states 607 and 608 share PDFs 612 and 613. Therefore, a single state 1507 may be generated to be used in the place of states 607 and 608. At the PDF level, PDFs 610 and 611 share PSDFs 617, 618, and 619. Therefore, a single PDF 1510 may be generated to be used in the place of PDFs 610 and 611. Thus, sharing may occur between adjacent levels so that the structure of any particular level shares structures at lower levels of the HMM structure.

Moreover, in the HMM structure of one embodiment sharing may occur at any level between the models, states, PDFs and PSDFs of that level. Thus, for example, PSDFs 626 and 627, if statistically similar, may be shared between PDF 616 to generate a single phoneme FDF 1520. The phoneme PDF 1520, in this case, would also represent a single phoneme PSDF 1520.

Thus, a method and apparatus for a parameter sharing speech recognition system have been provided. Although the present invention has been described with reference to specific exemplary embodiments, it will be evident that various modifications and changes may be made to these embodiments without departing from the broader spit and scope of the invention as set forth in the claims. Accordingly, the specification and drawings are to be regarded in an illustrative rather than a restrictive sense.

What is claimed is:

1. A method for recognizing speech comprising the steps of:
receiving speech signals into a processor;
processing the received speech signals using a speech recognition system produced by generating a plurality of phoneme models, wherein at least one of the plurality of phoneme models are shared among a plurality of phonemes, and at least a first one of the plurality of phoneme models are shared with at least a second one of the plurality of phoneme models; and
generating signals representative of the received speech signals.

2. The method of claim 1, wherein the speech recognition system is produced by:
training the plurality of phoneme models;
generating a plurality of shared probability sub-distribution functions from the trained plurality of phoneme models; and
evaluating the plurality of phoneme models for further sharing in response to the plurality of shared probability sub-distribution functions.

3. The method of claim 2, wherein the plurality of shared probability sub-distribution functions are generated by:
generating a plurality of phoneme model states, wherein at least one of the plurality of states are shared among the plurality of phoneme models;
generating a plurality of phoneme model probability distribution functions, wherein at least one of the plurality of probability distribution functions are shared among the plurality of states; and
generating a plurality of phoneme model probability sub-distribution functions, wherein at least one of the plurality of probability sub-distribution functions are shared among the plurality of phoneme model probability distribution functions.

4. The method of claim 3, wherein the plurality of shared probability sub-distribution functions are generated by:
generating a plurality of phoneme model states, wherein at least one of the plurality of phoneme model states are shared among the plurality of phoneme model states;
generating a plurality of phoneme model probability distribution functions, wherein at least one of the plurality of probability distribution functions are shared among the plurality of probability distribution functions; and
generating a plurality of phoneme model probability sub-distribution functions, wherein at least one of the plurality of probability sub-distribution functions are shared among the plurality of phoneme model probability sub-distribution functions.

5. The method of claim 2, wherein the plurality of phoneme models for further sharing are evaluated by:
generating a shared phoneme model probability distribution function to replace a plurality of probability distribution functions when each of the plurality of probability distribution functions has common probability sub-distribution functions;
generating a shared phoneme model state to replace a plurality of states when each of the plurality of states has common phoneme model probability distribution functions; and
generating a shared phoneme model to replace a plurality of models when each of the plurality of models has common phoneme model states.

6. The method of claim 2, wherein the plurality of shared probability distribution functions for a discrete hidden Markov model are generated from a continuous distribution function of a continuous hidden Markov model.

7. The method of claim 1, wherein the phoneme models are context dependent.

8. The method of claim 1, wherein the speech recognition system is based on a statistical learning approach.

9. The method of claim 8, wherein the statistical learning approach is a hidden Markov model.

10. The method of claim 1, wherein a plurality of phoneme models are generated by:
retaining as a separate phoneme model a triphone phoneme model for which a number of trained frames exceeds a threshold;
generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

11. The method of claim 10, wherein at least one shared phoneme model is generated comprising at least one context, the at least one context having statistical properties representative of a plurality of context phonemes.

12. The method of claim 1, wherein sharing occurs among a plurality of levels of a speech recognition model.

13. The method of claim 1, wherein sharing occurs within at least one level of a speech recognition model.

14. The method of claim 1, wherein the step of evaluating the plurality of phoneme models for further sharing is repeated at least one time.

15. The method of claim 1, wherein the plurality of phoneme models integrate discrete observation modeling and continuous observation modeling.

16. An apparatus for speech recognition comprising:

an input for receiving speech signals into a processor;

a processor configured to recognize the received speech signals using a speech recognition system to generate a signal representative of the received speech signal, the speech recognition system produced by generating and training a plurality of phoneme models, wherein at least one of the plurality of phoneme models are shared among a plurality of phonemes, and at least a first one of the plurality of phoneme models are shared with at least a second one of the plurality of phoneme models; and an output for providing a signal representative of the received speech signal.

17. The apparatus of claim 16, wherein the speech recognition system is produced by:

generating a plurality of phoneme model states, wherein at least one of the plurality of states are shared among the plurality of phoneme models;

generating a plurality of phoneme model probability distribution functions, wherein at least one of the plurality of probability distribution functions are shared among the plurality of states;

generating a plurality of phoneme model probability sub-distribution functions, wherein at least one of the plurality of probability sub-distribution functions are shared among the plurality of phoneme model probability distribution functions; and evaluating the plurality of phoneme models for further sharing in response to the plurality of shared probability sub-distribution functions.

18. The apparatus of claim 17, wherein the plurality of phoneme models are evaluated for further sharing by:

generating a shared phoneme model probability distribution function to replace a plurality of probability distribution functions when each of the plurality of probability distribution functions has common probability sub-distribution functions;

generating a shared phoneme model state to replace a plurality of states when each of the plurality of states has common phoneme model probability distribution functions; and generating a shared phoneme model to replace a plurality of models when each of the plurality of models has common phoneme model states.

19. The apparatus of claim 16, wherein sharing occurs among a plurality of levels of a speech recognition model, and wherein sharing occurs within at least one level of a speech recognition model.

20. The apparatus of claim 16, wherein the plurality of phoneme models are generated by:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

21. A speech recognition process comprising a statistical learning technique that uses a model, the model produced by:

generating and training a plurality of phoneme models, wherein at least one of the plurality of phoneme models are shared among a plurality of phonemes;

generating a plurality of shared probability sub-distribution functions from the trained plurality of phoneme models; and evaluating the plurality of phoneme models for further sharing in response to the plurality of shared probability sub-distribution functions.

22. The speech recognition process of claim 21, wherein sharing occurs among a plurality of levels of a speech recognition model, and wherein sharing occurs within at least one level of a speech recognition model.

23. The speech recognition process of claim 21, wherein the plurality of phoneme models are context dependent hidden Markov models, wherein the plurality of phoneme models integrate discrete observation modeling and continuous observation modeling.

24. The speech recognition process of claim 21, wherein the plurality of phoneme models are generated by:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

25. The speech recognition process of claim 21, wherein the plurality of shared probability sub-distribution functions are generated by:

generating a plurality of phoneme model states, wherein at least one of the plurality of states are shared among the plurality of phoneme models;

generating a plurality of phoneme model probability distribution functions, wherein at least one of the plurality of probability distribution functions are shared among the plurality of states; and generating a plurality of phoneme model probability sub-distribution functions, wherein at least one of the plurality of probability sub-distribution functions are shared among the plurality of phoneme model probability distribution functions.

26. The speech recognition process of claim 21, wherein the plurality of phoneme models are evaluated for further sharing by:

generating a shared phoneme model probability distribution function to replace a plurality of probability distribution functions when each of the plurality of probability distribution functions has common probability sub-distribution functions;

generating a shared phoneme model state to replace a plurality of states when each of the plurality of states has common phoneme model probability distribution functions; and generating a shared phoneme model to replace a plurality of models when each of the plurality of models has common phoneme model states.

27. A method for generating a plurality of phoneme models for use in a speech recognition system, the method comprising the steps of:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

28. The method of claim 27, wherein the phoneme models are hidden Markov models.

29. A computer readable medium containing executable instructions which, when executed in a processing system, causes the system to perform the steps for recognizing speech comprising:

receiving speech signals into a processor;

processing the received speech signals using a speech recognition system comprising a plurality of phoneme models, wherein at least one of the plurality of phoneme models are shared among a plurality of phonemes and at least a first one of the plurality of phoneme models are shared with at least a second one of the plurality of phoneme models; and generating signals representative of the received speech signals.

30. The computer readable medium of claim 29, wherein the speech recognition system is produced by:

generating a plurality of phoneme model states, wherein at least one of the plurality of states are shared among the plurality of phoneme models;

generating a plurality of phoneme model probability distribution functions, wherein at least one of the plurality of probability distribution functions are shared among the plurality of states;

generating a plurality of phoneme model probability sub-distribution functions, wherein at least one of the plurality of probability sub-distribution functions are shared among the plurality of phoneme model probability distribution functions; and evaluating the plurality of phoneme models for further sharing in response to the plurality of shared probability sub-distribution functions.

31. The computer readable medium of claim 29, wherein sharing occurs among a plurality of levels of a speech recognition model, and wherein sharing occurs within at least one level of a speech recognition model.

32. The computer readable medium of claim 29, wherein the plurality of phoneme models are generated by:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

33. A method for recognizing speech comprising the steps of:

receiving speech signals into a processor;

processing the received speech signals using a model comprising a plurality of phoneme models, wherein at least one of the plurality of phoneme models are shared among a plurality of phonemes, and at least a first one of the plurality of phoneme models are shared with at least a second one of the plurality of phoneme models; and generating signals representative of the received speech signals.

34. The method of claim 33, wherein the model further comprises:

a plurality of phoneme model states, wherein at least one of the plurality of states are shared among the plurality of phoneme models;

a plurality of phoneme model probability distribution functions, wherein at least one of the plurality of probability distribution functions are shared among the plurality of states; and a plurality of phoneme model probability sub-distribution functions, wherein at least one of the plurality of probability sub-distribution functions are shared among the plurality of phoneme model probability distribution functions.

35. The method of claim 33, wherein the plurality of phoneme models are generated by:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

36. The method of claim 33, wherein a plurality of shared phoneme models are evaluated for further sharing by:

generating a shared phoneme model probability distribution function to replace a plurality of probability distribution functions when each of the plurality of probability distribution functions has common probability sub-distribution functions;

generating a shared phoneme model state to replace a plurality of states when each of the plurality of states has common phoneme model probability distribution functions; and generating a shared phoneme model to replace a plurality of models when each of the plurality of models has common phoneme model states.

37. An apparatus for speech recognition comprising:

an input configured to receive speech signals into a processor;

a processor configured to process the received speech signals using a model comprising a plurality of phoneme models, wherein at least one of the plurality of phoneme models are shared among a plurality of phonemes, and at least a first one of the plurality of phoneme models are shared with at least a second one of the plurality of phoneme models; and an output configured to provide a signal representative of the received speech signal.

38. The apparatus of claim 37, wherein the model further comprises:

a plurality of phoneme model states, wherein at least one of the plurality of states are shared among the plurality of phoneme models;

a plurality of phoneme model probability distribution functions, wherein at least one of the plurality of probability distribution functions are shared among the plurality of states; and a plurality of phoneme model probability sub-distribution functions, wherein at least one of the plurality of probability sub-distribution functions are shared among the plurality of phoneme model probability distribution functions.

39. The apparatus of claim 37, wherein the plurality of phoneme models are generated by:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

40. A computer readable medium containing executable instructions which, when executed in a processing system, causes the system to perform the steps for recognizing speech comprising:

receiving speech signals into a processor;

processing the received speech signals using a model comprising a plurality of context dependent phoneme models, wherein at least one of the plurality of phoneme models are shared among a plurality of phonemes, and at least a first one of the plurality of phoneme models are shared with at least a second one of the plurality of phoneme models; and providing output signals representative of the received speech signals.

41. The computer readable medium of claim 40, wherein the model further comprises:

a plurality of phoneme model states, wherein at least one of the plurality of states are shared among the plurality of phoneme models;

a plurality of phoneme model probability distribution functions, wherein at least one of the plurality of probability distribution functions are shared among the plurality of states; and a plurality of phoneme model probability sub-distribution functions, wherein at least one of the plurality of probability sub-distribution functions are shared among the plurality of phoneme model probability distribution functions.

42. The computer readable medium of claim 40, wherein the plurality of phoneme models are generated by:

retaining as a separate phoneme model a triphone phoneme model for which a number of trained frames exceeds a threshold;

generating at least one shared phoneme model to represent a plurality of triphone phoneme models for which the number of trained frames having a common biphone exceeds the threshold;

generating at least one shared phoneme model to represent a plurality of triphone phoneme models for which the number of trained frames having an equivalent effect on a phonemic context exceeds the threshold; and generating at least one shared phoneme model to represent a plurality of triphone phoneme models having the same center context.

43. The computer readable medium of claim 40, wherein a plurality of shared phoneme models are evaluated for further sharing by:

generating a shared phoneme model probability distribution function to replace a plurality of probability distribution functions when each of the plurality of probability distribution functions has common probability sub-distribution functions;

generating a shared phoneme model state to replace a plurality of states when each of the plurality of states has common phoneme model probability distribution functions; and generating a shared phoneme model to replace a plurality of models when each of the plurality of models has common phoneme model states.

44. A system for recognizing speech comprising:

means for receiving speech signals into a processor;

means for processing the received speech signals using a speech recognition system produced by generating a plurality of phoneme models, wherein at least one of the plurality of phoneme models are shared among a plurality of phonemes, and at least a first one of the plurality of phoneme models are shared with at least a second one of the plurality of phoneme models; and means for generating signals representative of the received speech signals.

45. A system for generating a plurality of phoneme models for use in a speech recognition system, comprising:

means for retaining as a separate phoneme model a triphone phoneme model for which a number of trained frames exceeds a threshold;

means for generating at least one shared phoneme model to represent a plurality of triphone phoneme models for which the number of trained frames having a common biphone exceeds the threshold;

means for generating at least one shared phoneme model to represent a plurality of triphone phoneme models for which the number of trained frames having an equivalent effect on a phonemic context exceeds the threshold; and means for generating at least one shared phoneme model to represent a plurality of triphone phoneme models having the same center context.

* * * * *

UNITED STATES PATENT AND TRADEMARK OFFICE
CERTIFICATE OF CORRECTION

| | | |
|---|---|---|
| PATENT NO. | : | 6,006,186 |
| DATED | : | December 21, 1999 |
| INVENTOR(S) | : | Chen et al. |

It is certified that error appears in the above-identified patent and that said Letters Patent is hereby corrected as shown below:

In column 5 at line 52 insert --HMM-- between "the" and "is"

In column 9 at line 19 delete "fewer" and insert --further--

In column 9 at line 39 delete "his" and insert --this--

In column 13 at line 45 delete "spit" and insert --spirit--

Signed and Sealed this

Twenty-seventh Day of March, 2001

Attest:

NICHOLAS P. GODICI

Attesting Officer

Acting Director of the United States Patent and Trademark Office